United States Patent
Moro, Jr. et al.

(10) Patent No.: US 11,521,128 B2
(45) Date of Patent: Dec. 6, 2022

(54) THREAT ASSESSMENT OF UNMANNED AERIAL SYSTEMS USING MACHINE LEARNING

(71) Applicant: Raytheon Company, Waltham, MA (US)

(72) Inventors: Richard A. Moro, Jr., Melrose, MA (US); Erik D. Johnson, Boston, MA (US); Liyi Dai, Cambridge, MA (US); David W. Payne, Groveland, MA (US)

(73) Assignee: Raytheon Company, Waltham, MA (US)

( * ) Notice: Subject to any disclaimer, the term of this patent is extended or adjusted under 35 U.S.C. 154(b) by 262 days.

(21) Appl. No.: 16/946,157

(22) Filed: Jun. 8, 2020

(65) Prior Publication Data

US 2021/0383270 A1  Dec. 9, 2021

(51) Int. Cl.
*G06N 20/00* (2019.01)
*B64D 45/00* (2006.01)
*B64C 39/02* (2006.01)
*G05D 1/00* (2006.01)

(52) U.S. Cl.
CPC ........... *G06N 20/00* (2019.01); *B64C 39/024* (2013.01); *B64D 45/00* (2013.01); *G05D 1/0088* (2013.01); *B64C 2201/141* (2013.01)

(58) Field of Classification Search
CPC .............. G06N 20/00; B64C 39/024; B64C 2201/141; B64D 45/00; G05D 1/0088; G08G 5/0026; G08G 5/006; G08G 5/0069; G08G 5/0013
See application file for complete search history.

(56) References Cited

U.S. PATENT DOCUMENTS

| | | | |
|---|---|---|---|
| 4,109,883 A | 8/1978 | Korr et al. |
| 4,817,495 A | 4/1989 | Drobot |
| 5,059,839 A | 10/1991 | Rose et al. |
| 5,192,827 A | 3/1993 | Jasper |
| 5,251,550 A | 10/1993 | Grossler et al. |
| 5,645,137 A | 7/1997 | Pacholok |
| 5,835,545 A | 11/1998 | Turchi |
| 6,679,179 B1 | 1/2004 | Bohl et al. |
| 7,071,631 B2 | 7/2006 | Howard, II |

(Continued)

FOREIGN PATENT DOCUMENTS

| | | |
|---|---|---|
| EP | 3140710 A1 | 3/2017 |
| FR | 2783316 A1 | 3/2000 |

(Continued)

OTHER PUBLICATIONS

Notice of Allowance dated Aug. 20, 2021 in connection with U.S. Appl. No. 16/946,161, 10 pages.

(Continued)

*Primary Examiner* — Russell Frejd
*Assistant Examiner* — Ashley L Redhead, Jr.

(57) ABSTRACT

A method includes obtaining multiple data items from multiple heterogeneous data sources, where the multiple data items relate to an unmanned aerial system (UAS) flying in an area. The method also includes processing the multiple data items using a machine learning algorithm to determine a threat level of the UAS to one or more targets in the area. The method further includes outputting the threat level of the UAS for review by a user.

20 Claims, 6 Drawing Sheets

(56) References Cited

U.S. PATENT DOCUMENTS

| | | |
|---|---|---|
| 7,475,624 B1 | 1/2009 | Daily |
| 7,629,918 B2 | 12/2009 | Brown et al. |
| 7,775,146 B1 | 8/2010 | Bitar et al. |
| 9,500,446 B2 | 11/2016 | Crouch et al. |
| 9,689,976 B2 | 6/2017 | Parker et al. |
| 9,755,931 B2 | 9/2017 | Pan |
| 10,752,355 B1 | 8/2020 | Flick |
| 2008/0156219 A1 | 7/2008 | Voss et al. |
| 2010/0018428 A1 | 1/2010 | Regebro |
| 2010/0181424 A1 | 7/2010 | Goossen et al. |
| 2010/0295717 A1 | 11/2010 | Rourk |
| 2011/0203476 A1 | 8/2011 | Smogitel |
| 2017/0111102 A1 | 4/2017 | Fan et al. |
| 2017/0191804 A1 | 7/2017 | Stark et al. |
| 2017/0253348 A1 | 9/2017 | Ashdown et al. |
| 2017/0261292 A1 | 9/2017 | Armstrong et al. |
| 2019/0120600 A1 | 4/2019 | Holihan et al. |
| 2020/0106818 A1* | 4/2020 | Luong .................. B64C 39/024 |
| 2020/0162489 A1* | 5/2020 | Bar-Nahum ........ H04L 63/1433 |
| 2020/0272827 A1* | 8/2020 | Morrow .................... G06T 7/11 |
| 2020/0310414 A1 | 10/2020 | Torii et al. |
| 2021/0358310 A1* | 11/2021 | Sachs ..................... B64D 45/00 |

FOREIGN PATENT DOCUMENTS

| | | |
|---|---|---|
| WO | 2016154936 A1 | 10/2016 |
| WO | 2016/193722 A1 | 12/2016 |
| WO | 2019032162 A2 | 2/2019 |

OTHER PUBLICATIONS

Ackerman, "Raytheon Sets Phasers to Drone Destruction with Directed Energy Weapon Test," IEEE Spectrum, Nov. 2016, 2 pages.

Battelle, "DroneDefender," Brochure ID 510, Battelle Memorial Institute, Mar. 2017, 2 pages.

Federal Aviation Administration, "FAA Expands Drone Detection Pathfinder Initiative," Jul. 2016, 2 pages.

Lewis, "Raytheon EMP weapon tested by Boeing, USAF Research Lab," MMXVII Military Embedded Systems, Nov. 2012, 2 pages.

"Skywall—Capture Drones—Protect Assets," OpenWorks Engineering Ltd., Dec. 2016, 15 pages.

Gibbs, "Startup pitches anti-drone launcher as answer to rogue UAVs", The Guardian, OpenWorks Engineering Ltd., Mar. 2016, 3 pages.

Patel, "What is India's secret EMP weapon KALI 5000?," www.quora.com, Mar. 2015, 8 pages.

Prabhu, "Build your own mini-EMP generator and disrupt electronic gadgets," TechWorm, Jul. 2016, 5 pages.

Zhang, "This Rifle Shoots Down Drones with Radio Waves," www.petapixel.com, Oct. 2015, 12 pages.

International Search Report and Written Opinion of the International Searching Authority dated Oct. 30, 2018 in connection with International Patent Application No. PCT/US2018/046242, 13 pages.

Wikipedia, "LC circuit," Apr. 21, 2020, 9 pages.

Pender et al., "Electrical Engineers' Handbook; vol. V; Electric Communication and Electronics," 1936, p. 7-158.

"The counter UAS Directory from www.unmannedairspace.info", V.3, Nov. 2018, 81 pages.

Moro et al., "Crowd-Sourced Detection and Tracking of Unmanned Aerial Systems", U.S. Appl. No. 16/946,161, filed Jun. 8, 2020, 33 pages.

Office Action dated Oct. 23, 2020 in connection with U.S. Appl. No. 16/100,749, 17 pages.

International Search Report and Written Opinion of the International Searching Authority in connection with International Patent Application No. PCT/US2021/028844 dated Nov. 23, 2021, 11 pages.

Non-Final Office Action dated Apr. 13, 2021 in connection with U.S. Appl. No. 16/946,161, 12 pages.

International Search Report and Written Opinion of the International Searching Authority dated Dec. 9, 2021 in connection with International Patent Application No. PCT/US2021/028831, 9 pages.

Notice of Allowance dated Dec. 8, 2020 in connection with U.S. Appl. No. 16/100,749, 10 pages.

\* cited by examiner

THREAT ASSESSMENT OF UNMANNED AERIAL SYSTEMS USING MACHINE LEARNING

TECHNICAL FIELD

This disclosure is generally directed to unmanned aerial systems. More specifically, this disclosure is directed to threat assessment of unmanned aerial systems (or other manned or unmanned vehicles) using machine learning.

BACKGROUND

Inexpensive, small unmanned aerial systems (UASs) such as drones are proliferating rapidly. Numerous applications for UASs have been proposed and implemented, such as infrastructure and utility inspections, surveillance, package delivery, urban mobility, and the like. While most use cases involving UASs are beneficial, some UASs can be used for nefarious purposes, and these UASs can represent significant threats to a wide variety of targets. Unfortunately, the detection, discrimination, and threat assessment of UASs can be difficult, especially since the UASs often fly at low altitudes.

SUMMARY

This disclosure relates to threat assessment of unmanned aerial systems using machine learning.

In a first embodiment, a method includes obtaining multiple data items from multiple heterogeneous data sources, where the multiple data items relate to an unmanned aerial system (UAS) flying in an area. In some embodiments, at least one data source includes crowd-sourced information of UAS sightings using a specifically designed application. The method also includes processing the multiple data items using a machine learning algorithm to determine a threat level of the UAS to one or more targets in the area. The method further includes outputting the threat level of the UAS for review by a user.

In a second embodiment, a device includes at least one memory configured to store instructions and at least one processor coupled to the at least one memory. The at least one processor is configured when executing the instructions to obtain multiple data items from multiple heterogeneous data sources, where the multiple data items relate to a UAS flying in an area. The at least one processor is also configured when executing the instructions to process the multiple data items using a machine learning algorithm to determine a threat level of the UAS to one or more targets in the area. The at least one processor is further configured when executing the instructions to output the threat level of the UAS for review by a user.

In a third embodiment, a non-transitory computer readable medium contains instructions that when executed cause at least one processor to obtain multiple data items from multiple heterogeneous data sources, where the multiple data items relate to a UAS flying in an area. The non-transitory computer readable medium also contains instructions that when executed cause the at least one processor to process the multiple data items using a machine learning algorithm to determine a threat level of the UAS to one or more targets in the area. The non-transitory computer readable medium further contains instructions that when executed cause the at least one processor to output the threat level of the UAS for review by a user.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

FIGS. 1 through 7, described below, and the various embodiments used to describe the principles of the present invention in this patent document are by way of illustration only and should not be construed in any way to limit the scope of the invention. Those skilled in the art will understand that the principles of the present invention may be implemented in any type of suitably arranged device or system.

The ubiquitous availability of small unmanned aerial systems (UASs) poses increasing security threats to public safety that are difficult to prevent using conventional measures. For example, it can be difficult to assess the threat level of a small UAS in an urban area in the presence of legitimate UASs, where all are operating at low altitudes or within limited lines of sight. Also, most conventional solutions provide limited information available for the discrimination of small UASs. As a result, protection of potential targets (such as critical infrastructure key resources, major events of mass gathering, and the like) against attacks by small UAS is challenging.

The U.S. Federal Aviation Administration (FAA) has developed, and continues to evolve, rules and regulations for operations of UASs by defining restricted and prohibited airspaces for UASs. Protected airspace generally includes major airports and sites of national security but does not cover non-conventional targets, such as critical infrastructure, key resources, or sporting events. Furthermore, adherence to the FAA rules and regulations requires user cooperation, but the operator of a hostile UAS is unlikely to cooperate before an attack. It is noted that current rules on commercial uses of UASs and differences between hobbyist and commercial actors are areas of intense R&D, innovation, and rapid evolution of technology, regulations, and laws.

Various counter-UAS approaches have been developed to disable or destroy UASs that have been identified as hostile. These approaches can be used to achieve one or more of several objectives, such as (1) bringing down a UAS to ground or initiate a "return to home" maneuver by disrupting its operation through RF, GPS, or other signal jamming, (2) taking control of a targeted UAS through spoofing, (3) destroying a targeted UAS using a laser, projectile, or other mechanism, or (4) entangling the UAS's blades using nets. However, these approaches are expensive and are useful only after the identification of a hostile UAS. There exists no practical, low-cost system that assesses the potential threat level against a military or civilian target by the detected entity, specifically in this instantiation, a UAS operating at low altitudes or within a limited line of sight.

This disclosure provides systems and methods for assessing the degree of anomaly and potential threats of UASs using machine learning. As described in more detail below, the disclosed systems and methods provide for a centralized UAS tracking entity to combine heterogeneous data from multiple sources and use machine learning to assess a threat level of one or more UASs in real-time. This can include two related functions: 1. anomaly detection, and 2. threat assessment. In general, if a UAS is not determined to be anomalous, it is non-threatening. In practice, there can be many anomalous detections (e.g., nuisance alarms), and adjudication of the anomalous detections is where threat assessment is important. In some embodiments, the entity performs anomaly and threat assessment of each UAS (or other entity) for protection of conventional and non-conventional targets. The assessment can be based on a contextual technique called Object Based Production (OBP). OBP is an intelligence community approach that organizes data by the detected object or entity. Analysis is then performed on that combined data set to develop context. Various analysis techniques can be used, including Activity Based Intelligence (ABI).

While this disclosure is described with respect to UASs, it will be understood that the principles disclosed herein are also applicable to other types of vehicles or detected entities. For example, the disclosed embodiments can also be used with manned aerial vehicles (e.g., low flying aircraft) and vehicles in other domains (e.g., maritime or land traffic). Also, the disclosed embodiments can also be used in conjunction with other detection events or entities, such as chemical, biological, radiological, nuclear, or explosive sensing.

Figure 1:
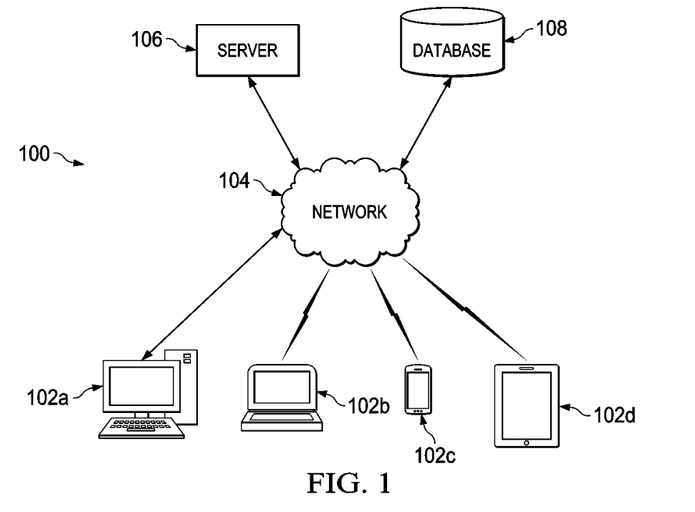
FIG. 1 illustrates an example system for assessing the degree of anomaly and potential threat of an unmanned aerial system (UAS) using machine learning according to this disclosure.

FIG. 1 illustrates an example system 100 for assessing the degree of anomaly and potential threat of a UAS using machine learning according to this disclosure. As shown in FIG. 1, the system 100 includes multiple user devices 102a-102d, at least one network 104, at least one server 106, and at least one database 108. Note, however, that other combinations and arrangements of components may also be used here.

In this example, each user device 102a-102d is coupled to or communicates over the network 104. Communications between each user device 102a-102d and a network 104 may occur in any suitable manner, such as via a wired or wireless connection. Each user device 102a-102d represents any suitable device or system used by at least one user to provide information to the server 106 or database 108 or to receive information from the server 106 or database 108. Example types of information may include detector readings, UAS vehicle information, temporal data, geospatial activity data, and the like.

Any suitable number(s) and type(s) of user devices 102a-102d may be used in the system 100. In this particular example, the user device 102a represents a desktop computer, the user device 102b represents a laptop computer, the user device 102c represents a smartphone, and the user device 102d represents a tablet computer. However, any other or additional types of user devices may be used in the system 100. Each user device 102a-102d includes any suitable structure configured to transmit and/or receive information.

The network 104 facilitates communication between various components of the system 100. For example, the network 104 may communicate Internet Protocol (IP) packets, frame relay frames, Asynchronous Transfer Mode (ATM) cells, or other suitable information between network addresses. The network 104 may include one or more local area networks (LANs), metropolitan area networks (MANs), wide area networks (WANs), all or a portion of a global network such as the Internet, or any other communication system or systems at one or more locations. The network 104 may also operate according to any appropriate communication protocol or protocols.

The server 106 is coupled to the network 104 and is coupled to or otherwise communicates with the database 108. The server 106 supports the retrieval of information from the database 108 and the processing of that information. Of course, the database 108 may also be used within the server 106 to store information, in which case the server 106 may store the information itself.

Among other things, the server 106 processes information used in assessing the degree of anomaly and potential threat of a UAS using machine learning. The server 106 includes any suitable structure configured to assess the degree of anomaly and potential threat of a UAS using machine learning. In some embodiments, the server 106 includes one or more processors, one or more memories, and one or more communication interfaces. Note, however, that the server 106 may be implemented in any suitable manner to perform the described functions. Also note that while described as a server here, the device(s) actually implementing the server 106 may represent one or more desktop computers, laptop computers, server computers, or other computing or data processing devices or systems.

The database 108 stores various information used, generated, or collected by the server 106 and the user devices 102a-102d. For example, the database 108 may store detector readings, UAS vehicle information, temporal data, geospatial activity data, and the like.

There are a number of possible ways to implement the system 100 in order to provide the described functionality for assessing the degree of anomaly and potential threat of a UAS using machine learning. For example, in some embodiments, the server 106 and database 108 are owned, operated, or managed by a common entity. In other embodiments, the server 106 and database 108 are owned, operated, or managed by different entities. Note, however, that this disclosure is not limited to any particular organizational implementation.

Although FIG. 1 illustrates one example of a system 100 for assessing the degree of anomaly and potential threat of a UAS using machine learning, various changes may be made to FIG. 1. For example, the system 100 may include any number of user devices 102a-102d, networks 104, servers 106, and databases 108. Also, while FIG. 1 illustrates that one database 108 is coupled to the network 104, any number of databases 108 may reside at any location or locations accessible by the server 106, and each database 108 may be coupled directly or indirectly to the server 106. In addition, while FIG. 1 illustrates one example operational environment in which machine learning can be used for assessing the degree of anomaly and potential threat of a UAS, this functionality may be used in any other suitable system.

Figure 2:
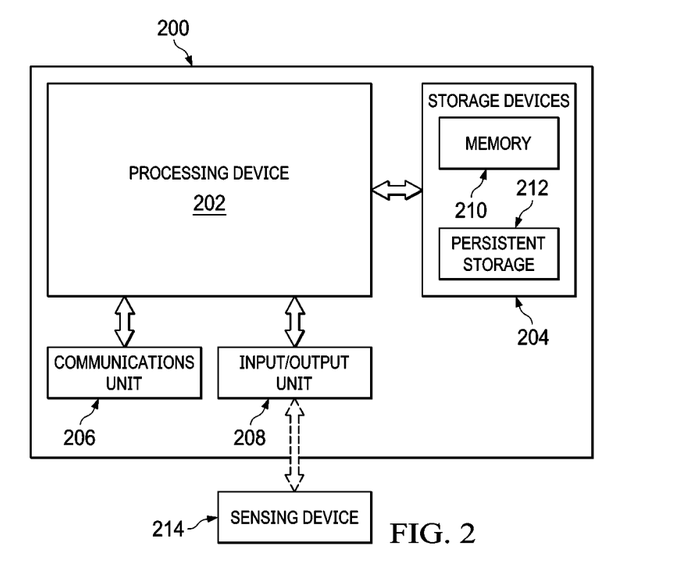
FIG. 2 illustrates an example device for assessing the degree of anomaly and potential threat of a UAS using machine learning according to this disclosure.

FIG. 2 illustrates an example device 200 for assessing the degree of anomaly and potential threat of a UAS using machine learning according to this disclosure. One or more instances of the device 200 may, for example, be used to at least partially implement the functionality of the server 106 of FIG. 1. However, the functionality of the server 106 may be implemented in any other suitable manner. Also, the same or similar arrangement of components may be used to at least partially implement the functionality of one or more of the user devices 102a-102d in FIG. 1. However, the functionality of each user device 102a-102d may be implemented in any other suitable manner.

As shown in FIG. 2, the device 200 denotes a computing device or system that includes at least one processing device 202, at least one storage device 204, at least one communications unit 206, and at least one input/output (I/O) unit 208. The processing device 202 may execute instructions that can be loaded into a memory 210. The processing device 202 includes any suitable number(s) and type(s) of processors or other devices in any suitable arrangement. Example types of processing devices 202 include one or more microprocessors, microcontrollers, digital signal processors (DSPs), application specific integrated circuits (ASICs), field programmable gate arrays (FPGAs), or discrete circuitry.

The memory 210 and a persistent storage 212 are examples of storage devices 204, which represent any structure(s) capable of storing and facilitating retrieval of information (such as data, program code, and/or other suitable information on a temporary or permanent basis). The memory 210 may represent a random access memory or any other suitable volatile or non-volatile storage device(s). The persistent storage 212 may contain one or more components or devices supporting longer-term storage of data, such as a read only memory, hard drive, Flash memory, or optical disc.

The communications unit 206 supports communications with other systems or devices. For example, the communications unit 206 can include a network interface card or a wireless transceiver facilitating communications over a wired or wireless network, such as the network 104. The communications unit 206 may support communications through any suitable physical or wireless communication link(s).

The I/O unit 208 allows for input and output of data. For example, the I/O unit 208 may provide a connection for user input through a keyboard, mouse, keypad, touchscreen, or other suitable input device. The I/O unit 208 may also provide a connection for an optional "add-on" sensing device 214, such as a sensor or camera, that can be added as an accessory to the device 200. The I/O unit 208 may also send output to a display, printer, or other suitable output device. Note, however, that the I/O unit 208 may be omitted if the device 200 does not require local I/O, such as when the device 200 can be accessed remotely.

In some embodiments, the instructions executed by the processing device 202 can include instructions that implement the functionality of the server 106 described above. For example, the instructions executed by the processing device 202 can include instructions for assessing the degree of anomaly and potential threat of a UAS using machine learning.

Although FIG. 2 illustrates one example of a device 200 for assessing the degree of anomaly and potential threat of a UAS using machine learning, various changes may be made to FIG. 2. For example, computing devices and systems come in a wide variety of configurations, and FIG. 2 does not limit this disclosure to any particular computing device or system.

Figure 3:
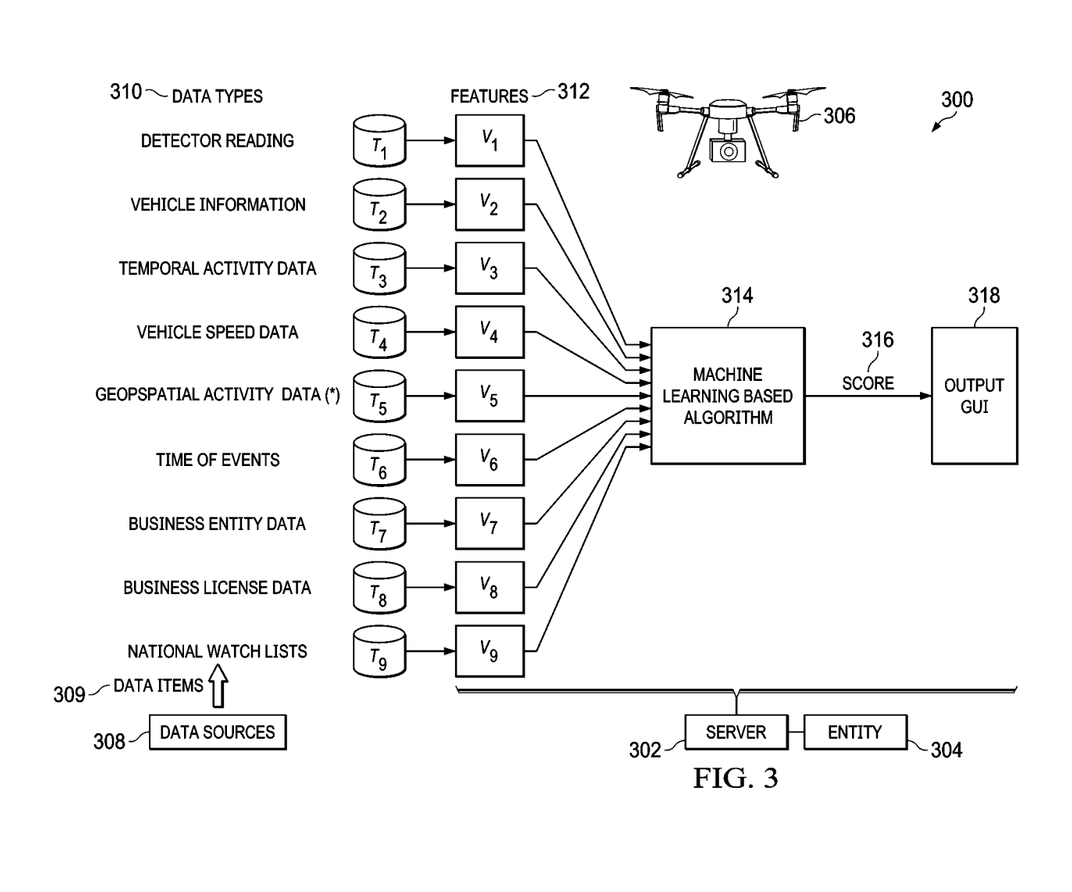
FIG. 3 illustrates an example process for assessing the degree of anomaly and potential threat of a UAS using machine learning according to this disclosure.

FIG. 3 illustrates an example process 300 for assessing the degree of anomaly and potential threat of a UAS using machine learning according to this disclosure. For ease of explanation, the process 300 is described as being performed using the system 100 of FIG. 1, which may be implemented using one or more devices 200 of FIG. 2. However, the process 300 may involve the use of any suitable device(s) in any suitable system(s).

As shown in FIG. 3, the process 300 can be performed by a server 302, which is owned or controlled by an entity 304. The server 302 represents a computing device or system that is capable of processing information for assessing the degree of anomaly and potential threat of a UAS, such as a UAS 306. In some embodiments, the server 302 represents (or is represented by) the server 106 in FIG. 1 or the device 200 in FIG. 2 described above. In some embodiments, the server 302 can be a cloud-based server or group of servers or other computing devices.

The UAS 306 represents a small UAS that typically operates at low altitudes and may operate in one or more areas with limited lines of sight, such as urban or suburban areas. In the process 300, the UAS 306 is in flight and proceeds along a flight path. Because information about the UAS 306 may not be readily or immediately known to the entity 304, the process 300 enables the entity 304 to collect information about the UAS 306 at the server 302. While FIG. 3 illustrates only one UAS 306, it will be understood that the process 300 may be used with multiple UASs 306.

The server 302 assesses the degree of anomaly and potential threat of each UAS 306 (such as whether the UAS 306 is expected, anomalous, benign, threatening, or the like) after receiving information about the presence of the UAS 306 in an area of interest. For example, the server 302 may receive information from a data source 308 that the UAS 306 has been detected in the area of interest. Detection information can come from one or more of multiple different data sources 308. The data sources 308 represent heterogeneous sources of information that can be provided to the server 302 for use in assessing threats of UASs 306. The data sources 308 represent any suitable structures, devices, or systems capable of providing data or information to the server 302 via any suitable communication technique, such as via a network. Some example data sources 308 can include, but are not limited to, sensors, commercial (third party) information sources, government or military information sources, public crowds of individuals having mobile devices, and the like.

To assess the degree of anomaly and potential threat of each UAS 306, the server 302 obtains multiple data items 309 about the UAS 306 from the data sources 308. The data items 309 can be classified into multiple heterogeneous data types 310. FIG. 3 shows the following examples of data types 310 representing data items 309 that can be used by the server 302 in the process 300. Of course, additional or alternative data types are possible and within the scope of this disclosure. Type $T_1$ represents detector readings, which can include, for example, readings from detectors or sensors like radar, cameras, and the like. Type $T_2$ represents vehicle information of the UAS 306, which can include, for example, the make and model of the UAS 306, the registered owner of the UAS 306, performance characteristics exhibited by that type of UAS, and the like. Type $T_3$ represents temporal activity data of the UAS 306, which can include, for example, the time of day that the UAS 306 is in flight, the day of the week or date of the flight, how long the UAS 306 has been flying, and the like. Type $T_4$ represents vehicle speed data of the UAS 306, which can include, for example, speed and direction information of the UAS 306 for an overall time period or at one or more particular points in time.

Type $T_5$ represents geospatial activity data associated with the UAS 306 or the surrounding area, which can include, for example, the types of geospatial context information available in an online mapping application like traffic information, weather information, proximity and direction to potential targets (such as a sports stadium or military base), and the like. This type of information is useful because it allows the server 302 to evaluate threats for many targets in the area of each UAS 306. This is in contrast to existing systems, which generally evaluate risk for only one or a handful of targets based on the sensors that are in place at or around those targets.

Type $T_6$ represents a time of occurrence of other events that are not specifically related to the UAS 306 or its movement but might have an impact on the threat assessment of the UAS 306. This can include, for example, temporal information of a sporting event occurring at a nearby stadium at a specific time, a delivery of important goods to a nearby site, a scheduled activity at a nuclear facility, and the like.

Type $T_7$ represents business entity data like business records related to an entity associated with the UAS 306, such as corporate data, criminal records of an employee or owner, and the like. This type of data can associate a particular actor with the UAS 306 based on registration of the flight plan with the unmanned traffic management (UTM) system. Based on that information, the server 302 can determine, for example, that the UAS 306 is a drone operated by a package carrier and is making a delivery.

Type $T_8$ represents business license information. This type of data informs the server 302 about any particular licenses of the operator of the UAS, such as whether the business have a commercial license to deliver products, perform aerial photography, perform news gathering, or the like. Type $T_9$ represents information from a government issued national watch list. Data of this type indicates whether the UAS 306 (or a UAS of that type) or an actor associated with the UAS 306 is on a watch list.

Some data items 309 can be classified into multiple data types 310. For example, the data items 309 may include UAS track data in the form of Electro-Optical/Infrared (EO/IR) images and videos, radar data, Radio Frequency (RF) signals, or sequences of GPS coordinates of the UAS 306. These data items 309 can be classified, for instance, as both detector readings (Type $T_1$) and vehicle speed data (Type $T_4$). In some embodiments, track information of the UAS 306 can be obtained via crowd sourcing techniques. One example of this type of technique is described in the Applicant's co-pending patent application (Attorney Docket No. 18-11470-US-NP (RAYN01-81470)), which is hereby incorporated by reference in its entirety. Crowd-sourced tracking information can fill in gaps of other track data, which may be limited due to line-of-sight or other issues. Other data items 309 can include contextual information from government and/or commercial data sources, and these data items 309 can be classified as one or more of the data types $T_1$-$T_9$ or as another data type 310.

After obtaining the data items 309 having the data types 310, the server 302 can extract one or more features 312 from the data items 309 of each data type 310. In general, the features 312 are normalized scores, vectors, or other values representing how anomalous the values of the data items 309 are. In some embodiments, the server 302 can extract one feature 312 (specifically identified as $V_1$-$V_9$ in FIG. 3) for data items 309 of each of the data types 310 $T_1$-$T_9$. That is, the server 302 can extract a feature $V_1$ for the data items 309 of data type $T_1$, a feature $V_2$ for the data items 309 of data type $T_2$, and so on. The specific mechanism for extraction of the features $V_1$-$V_9$ from the data types $T_1$-$T_9$ is data-dependent. Because some data patterns are not intuitive or obvious, the determination of the features 312 depends on subject matter expertise across multiple data sets and multiple domains.

Using the features 312, the server 302 performs a machine learning algorithm 314 to assess the degree of anomaly and potential threat of each UAS 306. Threat assessment of the UAS 306 is performed using the machine learning algorithm 314 based on analysis and understanding of contextual Activity Based Intelligence (ABI). Using the machine learning algorithm 314, the server 302 fuses the heterogeneous data items 309, including track data for the UAS 306 and contextual information, and examines relationships between the data to assess the threat of the UAS 306. The extraction of the features 312 from the heterogeneous data items 309 serves to transform both physical data and non-physical contextual ABI into suitable formats for use by the machine learning algorithm 314. In some embodiments, the machine learning algorithm 314 can use predictive analytics to generate a response.

The following example illustrates relationships between heterogeneous data items 309 of different data types 310 from different sources 308. The server 302 may obtain a track of the UAS 306 from one or more of the data sources 308. In some embodiments, the server 302 can combine track data from the different sources 308 to produce an estimated track of the UAS 306. The server 302 can extract one or more track information features 312 from the track information. However, track information by itself, in the absence of other information, may not be enough information to assess a threat of the UAS 306. Accordingly, the server 302 may perform the machine learning algorithm 314 by combining the track information features 312 with other features 312 about the UAS 306, to establish a pattern of life. A pattern of life includes behaviors and movements associated with a particular entity over a given period of time. In this example, the server 302 may obtain and examine a historical set of patterns of life for different UASs on different missions (crop inspection, power line inspection, bombing runs, and the like) or others actors or objects (e.g. law enforcement/medical/news helicopter operations, birds, and the like) to compare to the track information of the UAS 306.

As particular examples, if the server 302 determines that the UAS 306 moves in a zigzag pattern, this may be consistent with a crop inspection mission. If the server 302 determines that the UAS 306 moves in a figure-eight pattern, this may be consistent with a surveillance mission. Using the machine learning algorithm 314, the server 302 can detect one or more anomalies in the track data by analyzing any differences between the current flying path of the UAS 306 and historical patterns of track data for the UAS 306 or UASs of that type. Anomaly detection can also include determining in real-time if the flying path violates any FAA airspace restrictions, such as the Temporal Flight Restrictions (TFRs) or Notices to Airmen (NOTAMs), or if the UAS 306 is operating outside FAA-designated UAS safe flying zones.

A pattern of life might represent one feature 312 that the server 302 uses in the machine learning algorithm 314 for making a threat assessment, such as determining a threat level. Another feature 312 might be if the UAS 306 has a transponder and is broadcasting information, such as its identifier (ID). This feature 312 can be referenced to registered flight plans to see if there is a correspondence. Other features 312 can include geospatial and temporal information, such as the time of day that the UAS 306 is flying, events that are occurring at approximately that time, and the like.

If the server 302 detects a track anomaly, the server 302 can use contextual data with the machine learning algorithm 314 to further inform the threat assessment. For example, the server 302 can cross-reference owner information of the UAS 306 obtained from a UAS registration source with one or more databases maintained by state or federal government agencies or from commercial sources. The server 302 can analyze the contextual data from such databases to identify any records of concern or anomalous information in the records. The server 302 can combine the results of such contextual ABI with the physical track data of the UAS 306 as input features 312 to the machine learning algorithm 314 for threat assessment of the UAS 306.

Figure 4:
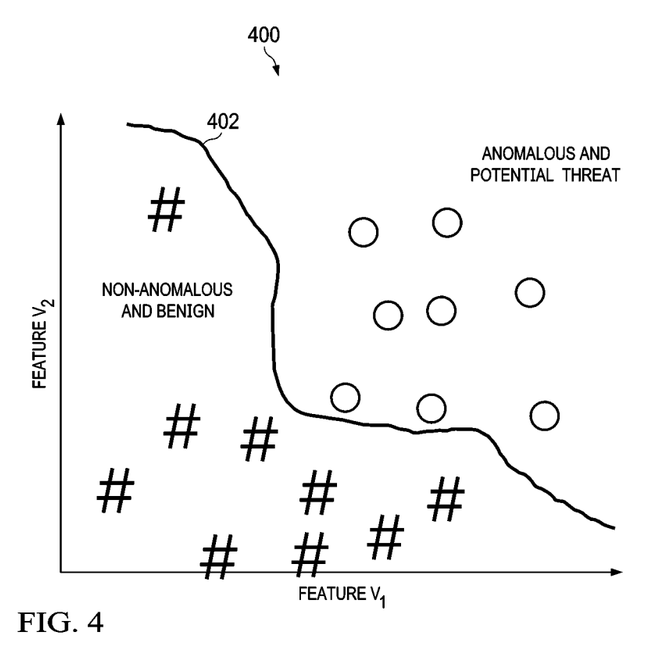
FIG. 4 illustrates an example profile map for assessing the degree of anomaly and potential threat of a UAS according to this disclosure.

In some embodiments, using the machine learning algorithm 314, the server 302 can generate a profile of the UAS 306. The profile of the UAS 306 can be cross-referenced with a profile map to enable the determination of the threat of the UAS 306. FIG. 4 illustrates an example profile map 400 for assessing the degree of anomaly and potential threat of a UAS according to this disclosure. As shown in FIG. 4, the map 400 is a two-dimensional profile map with one feature $V_1$ mapped on the x axis and another feature $V_2$ mapped on the y axis. For ease of explanation, the map 400 shows only two dimensions. In actual implementations, each of the features $V_1$ through $V_9$ could be mapped to a different axis/dimension. Over time, a curve 402 can be determined using the machine learning algorithm 314. Data points on one side of the curve 402 can represent UAS activity that is anomalous and a potential threat, and data points on another side of the curve 402 can represent UAS activity that is expected or non-anomalous and benign.

In some embodiments, execution of the algorithm 314 is based on Privacy by Design principals and best practices. This can be reflected in different algorithm tiers that work on different types of data (e.g., public versus private, unclassified versus classified, and the like). Different tiers can be triggered by different scenarios, business rules, or trigger thresholds for different agencies. For example, intelligence agencies can have different access than local law enforcement.

In some embodiments, the generated profile of the UAS 306 can be reduced or translated to a score 316. The score 316 indicates the severity of the threat of the UAS 306. For example, a higher score 316 could indicate a higher level of threat and a lower score 316 could indicate a lower level of threat, or a higher score 316 could indicate a lower level of threat and a lower score 316 could indicate a higher level of threat. The score 316 can be output by the server 302 in a manner that is understood by human users. In some embodiments, the score 316 can be communicated to human users through one or more graphical user interfaces (GUIs) 318. Use of the score 316 to indicate the threat of the UAS 306 improves user experience, since users can easily understand the threat level.

In some embodiments, the score 316 is shown on the GUI 318 with analytics information that explains or justifies how the machine learning algorithm 314 reached its decision (like how the score 316 was determined or the reasons for the designation of the threat level). This support information can help generate user confidence that the threat assessment is accurate. In some embodiments, the GUI 318 is organized so that all relevant information is readily available in one place for human adjudication, for taking further actions if warranted, and securely archived to preserve a chain of evidence for possible future legal proceedings or after action reviews.

In some embodiments of the process 300 shown in FIG. 3, there may be limited information available for the discrimination of small UASs, such as the UAS 306. In many cases, small UASs can be confused with birds or even ground clutter by radar and other sensing or detecting mechanisms. In addition, actual occurrences of truly-threatening UASs are (currently) rare events. Thus, data representing true UAS threats can be limited. To alleviate issues of limited data, synthetic high-fidelity data can be generated for training the machine learning algorithm 314 for threat assessment. For example, the training data can be generated by the server 302 or by another computing device or system associated with the process 300. In some embodiments, the training data can be generated by combining actual track data of observed UAS activities in the past with threat modeling. The track data can be augmented with contextual data using data provided from government agencies or commercial data sources.

One example objective of the process 300 is to enable protection of non-conventional soft targets, such as critical infrastructure (important facilities like military installations, major government buildings, or transportation hubs) or major national events (like major sporting events, concerts, or holiday or festival celebrations), against attacks by small hostile UASs. Protection of such targets in dense urban areas can be challenging because it may be difficult or impractical to set up a safe and sufficiently large perimeter of protection, especially when targets are spread over a large geographical area.

To address this issue, the process 300 can use location-based geospatial risk analysis and contextual information of a defended area within which a UAS 306 is operating as part of the threat assessment. In this approach, the process 300 (such as the server 302) can classify multiple targets in a geographical area into a fixed number of groups. Targets in each group are associated with weighting factors that reflect the importance of the targets and the likelihood that they may be selected as potential targets by the operator of the UAS 306. In some embodiments, for instance, heat maps may be used to display a concentration of multiple targets in a geographical area.

Figure 5:
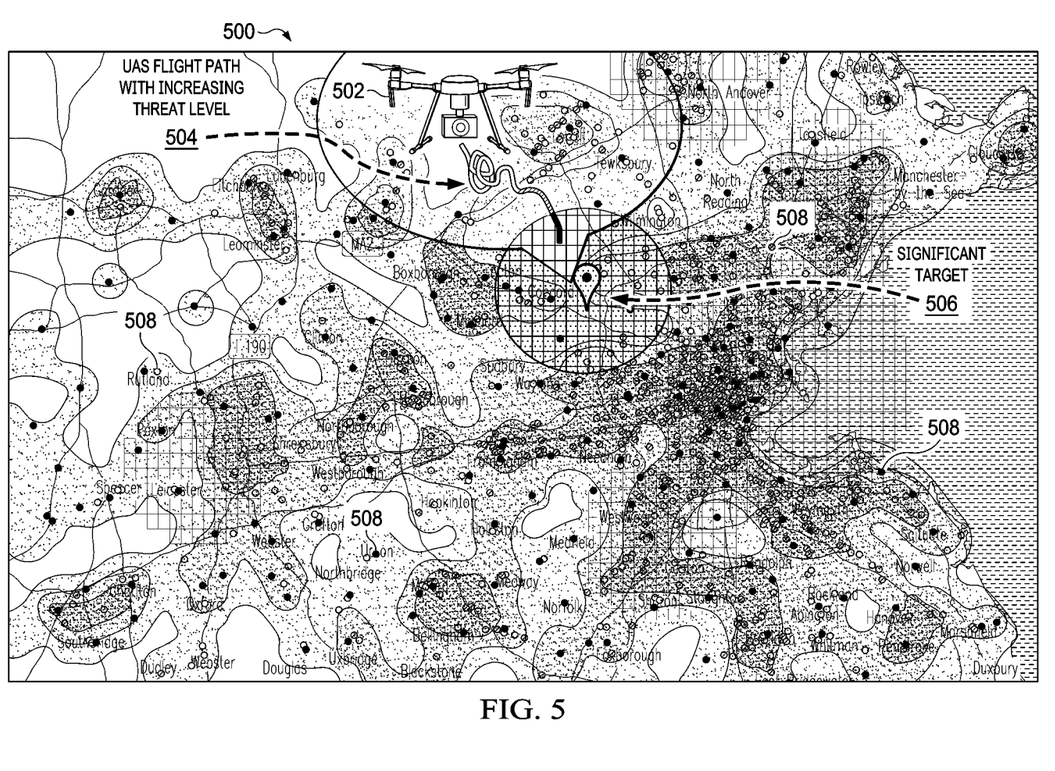
FIG. 5 illustrates an example heat map for displaying a threat of a UAS according to this disclosure.

FIG. 5 illustrates an example heat map 500 for displaying a threat of a UAS according to this disclosure. As shown in FIG. 5, the heat map 500 represents a geographical area. A UAS 502 (such as the UAS 306) is observed to be flying in the area, and a flight path 504 of the UAS 502 is shown on the heat map 500. The heat map 500 also shows multiple targets in the area, including one or more significant targets 506 (such as a military base) and one or more soft targets 508. As indicated above, the targets 506-508 can be classified into one or more groups, where the targets 506-508 in each group are associated with weighting factors that reflect the importance of the targets 506-508 and the likelihood that the targets 506-508 may be selected as potential targets by the UAS 502. In some embodiments, a weighting score can be displayed and viewed for each target 506-508. When there are a large number of targets 506-508, such as shown in the heat map 500, the heat map 500 can be displayed at different zoom levels to facilitate distinguishing the individual targets 506-508 and displaying the weighting score. At a zoomed-out level, the heat map 500 provides an overall picture of where the targets 506-508 are distributed, such as where the targets 506-508 are most concentrated. The heat map 500 can change over time depending on a number of factors, such as what events may be occurring in that area at a given time (like a sporting event, a political rally, and the like).

For each location shown in the heat map 500, a threat assessment parameter, referred to as a target concentration factor (TCF), can be calculated by aggregating the weighting factors and also based on the concentration (density) and geospatial distribution characteristics of the targets 506-508 near the location. Thus, the TCF is a quantification of location-based risk and threat of the UAS 502 to the targets 506-508 based on geospatial location and area, type of threat, target geospatial distribution, and the like. In some embodiments, the TCF is normalized to be within a specified range of values, such as a range of [0, 1]. A higher TCF may indicate the existence of more important targets 506-508 near the location, while a lower TCF may indicate fewer targets 506-508 or less important targets 506-508. Of course, this is merely one example, and other embodiments can include other ranges, values, and meanings for the TCF.

Each TCF can be calculated by the server 302 or by another computing device associated with the process 300. The server 302 can use each TCF as a data item 309 for the extraction of the features 312 in the threat assessment process 300. Each TCF can change over time as events occur over time (such as a sporting event, a political rally, an occurrence of a local or national threat by a political enemy, and the like). Each TCF can also change based on the interested party. For example, a TCF for a private industry stakeholder might be different than a TCF for a government entity that is concerned with different assets. As a particular example, military police protecting a military base may have different threat thresholds than local law enforcement protecting a football stadium located near the military base. Thus, a TCF in the area may be different for each party.

Although FIG. 3 illustrates one example of a process 300 for assessing the degree of anomaly and potential threat of a UAS using machine learning, various changes may be made to FIG. 3. For example, the number of servers, data sources, data items, data types, or features may be different than what is shown in FIG. 3. Although FIG. 4 illustrates one example of a profile map 400 for assessing the degree of anomaly and potential threat of a UAS and FIG. 5 illustrates one example of a heat map 500 for displaying a threat of a UAS, various changes may be made to FIGS. 4 and 5. For instance, the profile map 400 and heat map 500 shown here are examples only, and any other suitable profile map and heat map may be generated for a specified area or environment.

Figure 6:
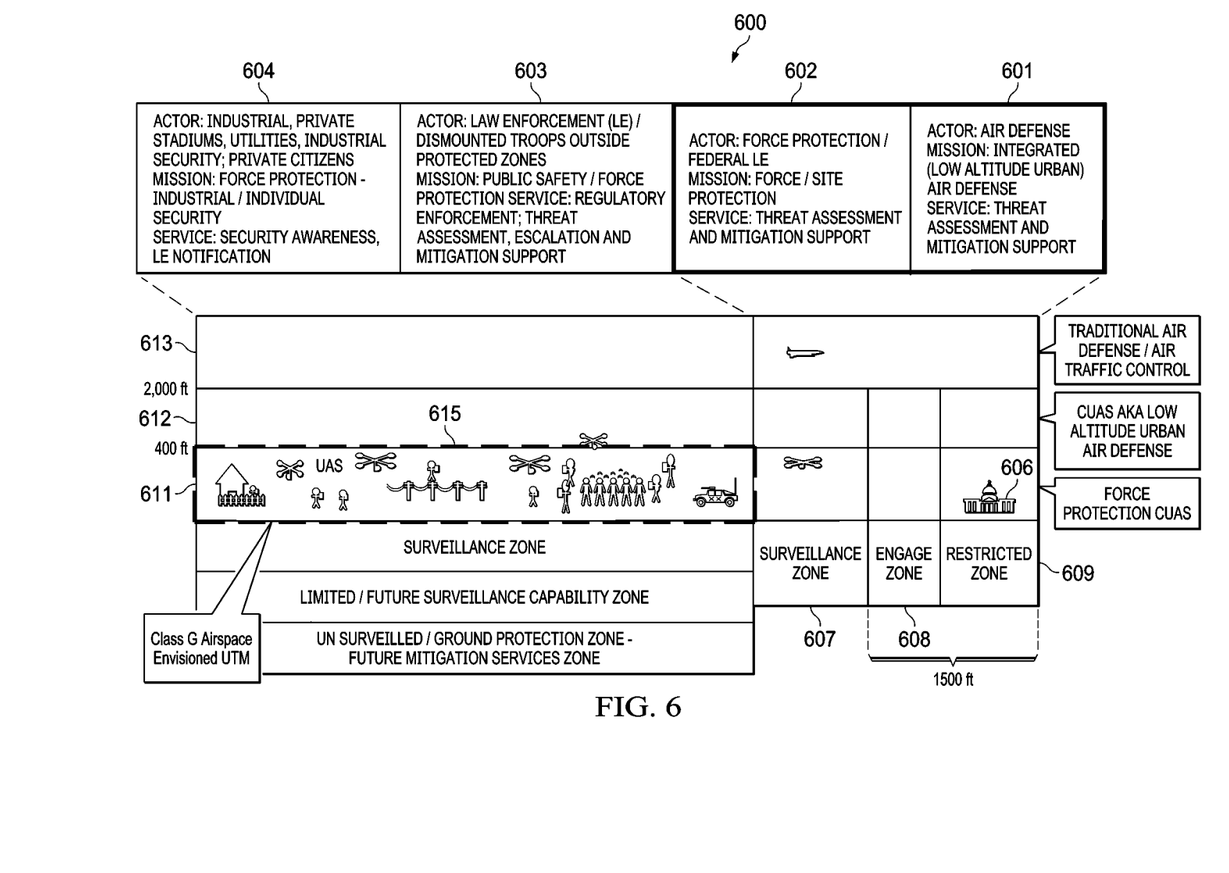
FIG. 6 illustrates an example geospatial representation of a counter-UAS solution in which detection, tracking, and threat assessment of UASs can be performed according to this disclosure.

FIG. 6 illustrates an example geospatial representation of a counter-UAS solution 600 in which detection, tracking, and threat assessment of UASs can be performed according to this disclosure. For ease of explanation, the counter-UAS solution 600 is described as being used with the process 300 of FIG. 3 and may include the system 100 of FIG. 1. However, the counter-UAS solution 600 may involve the use of any suitable device(s), process(es), and system(s).

As shown in FIG. 6, the counter-UAS solution 600 includes multiple groups of actors 601-604. The actors 601 include traditional air defense actors (such as the military) for protection from planes, missiles, and the like. The actors 602 include newer air defense actors, such as military police. The actors 603 include local non-military authorities like local law enforcement (such as civilian police forces). The actors 604 include private industry actors, such as businesses, industry, utilities, concerned individuals (e.g., celebrities or individuals who greatly value their privacy), and the like.

Each group of actors 601-604 has one or more counter-actions that the actors 601-604 can take in the event of a UAS sighting. For example, both actors 601 and 602 have authority for interdiction when a UAS is observed, such as destroying the UAS, interfering with operation of the UAS, and the like. The type of interdiction performed can depend on how close the UAS is to a particular protected asset 606. For example, depending on whether the UAS enters a surveillance zone 607, an engagement zone 608, or a restricted zone 609 associated with the asset 606, the type of interdiction can become more significant. Each zone 607-609 can be defined by a radius from the asset 606. In some embodiments, the actors 603 and 604 do not have authority to perform any interdiction of UASs. However, the actors 603 and 604 can issue orders to people and businesses (such as an order to take cover).

The counter-UAS solution 600 is also defined by altitude zones 611-613, where the altitude zone 611 is low altitude (such as less than 400 feet), the altitude zone 612 is mid altitude (such as 400 feet to 2,000 feet), and the altitude zone 613 is high altitude (such as greater than 2,000 feet). Of course, these values are merely examples, and other embodiments may include different numbers of altitude zones at different thresholds. In some cases, the threat assessment processes disclosed here can be performed in the low altitude zone 611 and in a surveillance zone 607 as represented by the dashed lines indicated at 615. However, other use cases of the threat assessment processes may be possible.

Although FIG. 6 illustrates one example of a counter-UAS solution 600 in which detection, tracking, and threat assessment of UASs can be performed, various changes may be made to FIG. 6. For example, the solution 600 can include any suitable number of actors, surveillance zones, altitude zones, and counter-actions.

Figure 7:
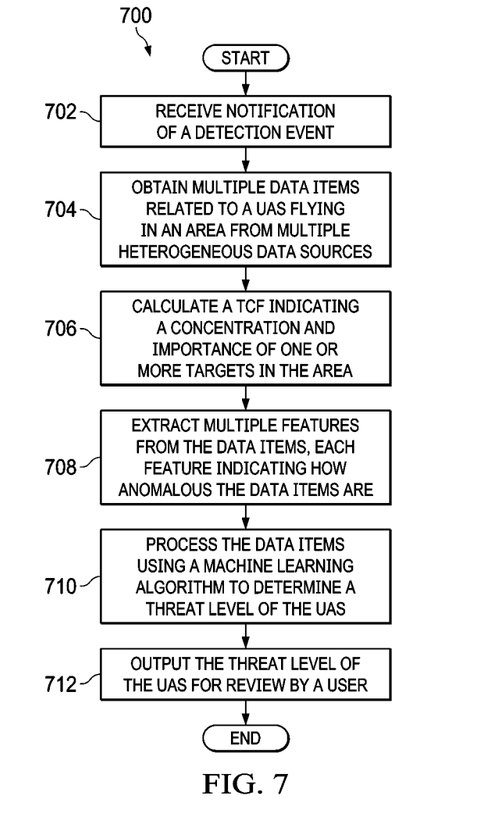
FIG. 7 illustrates an example method for assessing the degree of anomaly and potential threat of a UAS using machine learning according to this disclosure.

FIG. 7 illustrates an example method 700 for assessing the degree of anomaly and potential threat of a UAS using machine learning according to this disclosure. For ease of explanation, the method 700 of FIG. 7 may be described as being performed using the server 302 of FIG. 3, which may be implemented using one or more devices 200 of FIG. 2. However, the method 700 may involve the use of any suitable device(s) in any suitable system(s).

As shown in FIG. 7, an event is detected at step 702. The detection event is associated with detection of a UAS flying in an area. The detection event can be notified to a server. This may include, for example, the server 302 being notified of a detection event from a sensor network, one of the data sources 308, or the like.

Multiple data items from multiple heterogeneous data sources are obtained at step 704. The multiple data items are related to the UAS flying in the area. This may include, for example, the server 302 obtaining multiple data items 309 related to the UAS 306 from multiple data sources 308. A TCF for the UAS is calculated at step 706. The TCF indicates a concentration and importance of one or more targets in the area. This may include, for example, the server 302 calculating the TCF of one or more targets 506-508. The TCF can be used as one or more data items 309 for a machine learning algorithm 314.

Multiple features from the data items are extracted at step 708. Each feature indicates how anomalous the data items are. In some embodiments, the multiple features are inputs to the machine learning algorithm 314. This may include, for example, the server 302 extracting multiple features 312 from the data items 309 for input into the machine learning algorithm 314. The multiple data items are processed using the machine learning algorithm to assess the threat level of the UAS to one or more targets in the area at step 710. This may include, for example, the server 302 using the machine learning algorithm 314 to assess the threat level of the UAS 306.

The threat level of the UAS is output for review by a user at step 712. In some embodiments, the threat level is represented as a score that indicates a severity of a threat by the UAS to the one or more targets in the area. Also, in some embodiments, the score is presented on a graphical user interface with analytics information indicating how the machine learning algorithm assessed the threat level. This may include, for example, the server 302 presenting the score 316 on the GUI 318.

Although FIG. 7 illustrates one example of a method 700 for assessing the degree of anomaly and potential threat of a UAS using machine learning, various changes may be made to FIG. 7. For example, while shown as a series of steps, various steps in FIG. 7 may overlap, occur in parallel, occur in a different order, or occur any number of times.

Among other things, the embodiments described above provide for the expansion of air defense to non-traditional actors, including civilian, commercial, and law enforcement actors. In some cases, the threat assessment information determined in the disclosed embodiments can fill in gaps in the military kill chain, the Intelligence Community (IC) intelligence cycle, and the Law Enforcement Suspicious Activity Report investigation cycle. Also, in some cases, the threat assessment information can be provided to traditional or institutional kill chain actors or other law enforcement personnel who have additional active mitigation authorizations.

In some embodiments, various functions described in this patent document are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable storage device.

It may be advantageous to set forth definitions of certain words and phrases used throughout this patent document. The terms "application" and "program" refer to one or more computer programs, software components, sets of instructions, procedures, functions, objects, classes, instances, related data, or a portion thereof adapted for implementation in a suitable computer code (including source code, object code, or executable code). The term "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in the present application should not be read as implying that any particular element, step, or function is an essential or critical element that must be included in the claim scope. The scope of patented subject matter is defined only by the allowed claims. Moreover, none of the claims invokes 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," or "controller" within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method comprising:
generating training data by combining actual track data of one or more previous unmanned aerial system (UAS) activities with threat modeling;
training a machine learning algorithm using the training data;
obtaining multiple data items from multiple heterogeneous data sources, the multiple data items related to a UAS flying in an area;
processing the multiple data items using the trained machine learning algorithm to determine a threat level of the UAS to one or more targets in the area; and
outputting the threat level of the UAS for review by a user.

2. The method of claim 1, wherein the threat level is represented as a score that indicates a severity of a threat by the UAS to the one or more targets in the area.

3. The method of claim 2, wherein the score is presented on a graphical user interface with analytics information indicating how the machine learning algorithm determined the threat level.

4. The method of claim 1, further comprising:
extracting multiple features from the data items, each feature indicating how anomalous the data items are;
wherein the multiple features are inputs to the machine learning algorithm.

5. The method of claim 1, further comprising:
calculating a target concentration factor (TCF) indicating a concentration and importance of the one or more targets in the area, wherein the TCF comprises one of the multiple data items.

6. The method of claim 1, wherein the multiple data items are classified into multiple heterogeneous data types.

7. The method of claim 1, wherein the machine learning algorithm is further trained using contextual data from one or more government agencies or commercial data sources.

8. The method of claim 1, wherein at least one of the multiple heterogeneous data sources comprises a public crowd source.

9. A device comprising:
at least one memory configured to store instructions; and
at least one processor coupled to the at least one memory and configured when executing the instructions to:
generate training data by combining actual track data of one or more previous unmanned aerial system (UAS) activities with threat modeling;
train a machine learning algorithm using the training data;
obtain multiple data items from multiple heterogeneous data sources, the multiple data items related to a UAS flying in an area;
process the multiple data items using the trained machine learning algorithm to determine a threat level of the UAS to one or more targets in the area; and
output the threat level of the UAS for review by a user.

10. The device of claim 9, wherein the threat level is represented as a score that indicates a severity of a threat by the UAS to the one or more targets in the area.

11. The device of claim 10, further comprising:
a display configured to present the score in a graphical user interface with analytics information indicating how the machine learning algorithm determined the threat level.

12. The device of claim 9, wherein:
the at least one processor is further configured to extract multiple features from the data items, each feature indicating how anomalous the data items are; and
the multiple features are inputs to the machine learning algorithm.

13. The device of claim 9, wherein:
the at least one processor is further configured to calculate a target concentration factor (TCF) indicating a concentration and importance of the one or more targets in the area; and
the TCF comprises one of the multiple data items.

14. The device of claim 9, wherein the multiple data items are classified into multiple heterogeneous data types.

15. The device of claim 9, wherein the machine learning algorithm is further trained using contextual data from one or more government agencies or commercial data sources.

16. The device of claim 9, wherein at least one of the multiple heterogeneous data sources comprises a public crowd source.

17. A non-transitory computer readable medium containing instructions that when executed cause at least one processor to:
generate training data by combining actual track data of one or more previous unmanned aerial system (UAS) activities with threat modeling;
train a machine learning algorithm using the training data;
obtain multiple data items from multiple heterogeneous data sources, the multiple data items related to a UAS flying in an area;
process the multiple data items using the trained machine learning algorithm to determine a threat level of the UAS to one or more targets in the area; and
output the threat level of the UAS for review by a user.

18. The non-transitory computer readable medium of claim 17, wherein the threat level is represented as a score that indicates a severity of a threat by the UAS to the one or more targets in the area.

19. The non-transitory computer readable medium of claim 18, wherein the score is presented on a graphical user interface with analytics information indicating how the machine learning algorithm determined the threat level.

20. The non-transitory computer readable medium of claim 17, wherein:
the instructions when executed further cause the at least one processor to extract multiple features from the data items, each feature indicating how anomalous the data items are; and
the multiple features are inputs to the machine learning algorithm.

* * * * *